C. H. SAPPER.
GEAR DRAWING INSTRUMENT.
APPLICATION FILED FEB. 4, 1916.

1,219,782.

Patented Mar. 20, 1917.
2 SHEETS—SHEET 1.

WITNESSES

INVENTOR
Charles H. Sapper
BY
ATTORNEYS

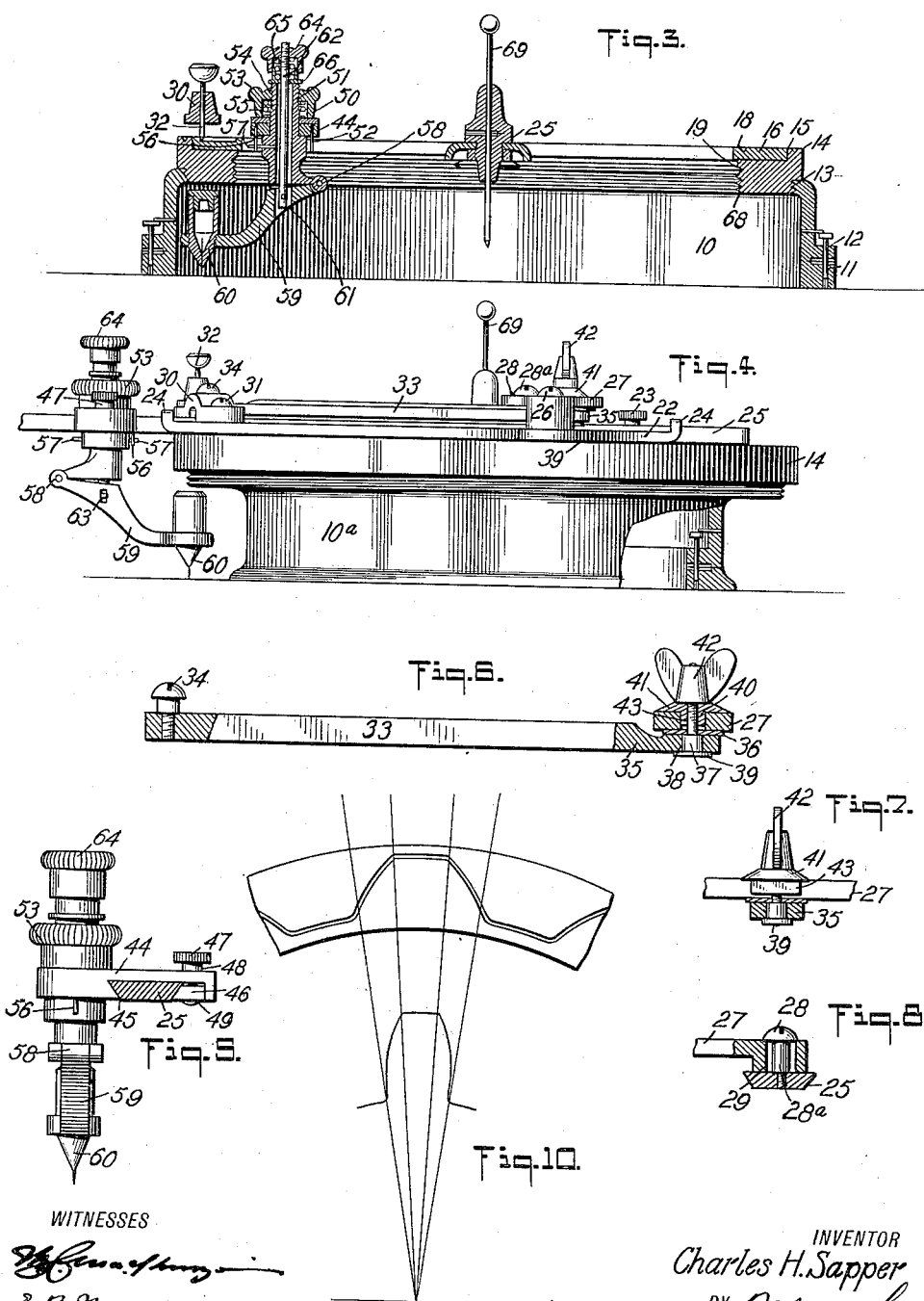

UNITED STATES PATENT OFFICE.

CHARLES H. SAPPER, OF NORFOLK, VIRGINIA.

GEAR-DRAWING INSTRUMENT.

1,219,782.   Specification of Letters Patent.   Patented Mar. 20, 1917.

Application filed February 4, 1916. Serial No. 76,118.

*To all whom it may concern:*

Be it known that I, CHARLES H. SAPPER, a citizen of the United States, and a resident of Norfolk, in the county of Norfolk and State of Virginia, have invented a new and Improved Gear-Drawing Instrument, of which the following is a full, clear, and exact description.

My invention has for its object to provide an instrument for drawing gears which may be adjusted for drawing gears with any desired number of teeth and of any pitch diameter. The instrument may be operated to trace the shape of the teeth over a master ring, and by means provided, move a pen over paper to draw the gear teeth thereon, the said means being adjustable to draw the gear of the desired diameter and the teeth of the desired depth.

Still other objects of the invention will appear in the following specification, in which the preferred form of my invention is described.

In the drawings similar reference characters denote similar parts in all the views, in which—

Fig. 4 is a side elevation showing the instrument with another type of base, parts of the base being broken away to illustrate features of the construction;

Fig. 5 is an enlarged view showing the marking means, the beam on which the marking means is mounted being illustrated in section;

Fig. 6 is a sectional view of the link which connects the two levers, the means for securing the link to the lever articulated to the beam being illustrated;

Fig. 7 is a fragmentary sectional view of the link which is articulated to the beam;

Fig. 8 is a fragmentary sectional view illustrating the means for articulating the lever to the beam;

Fig. 9 is a sectional view of the frame on which the levers are mounted; and

Fig. 10 is a view illustrating a tooth which has been drawn with the instrument, the relative positions of the teeth of the master ring and the teeth of the gear drawn therefrom being indicated.

Figure 1:
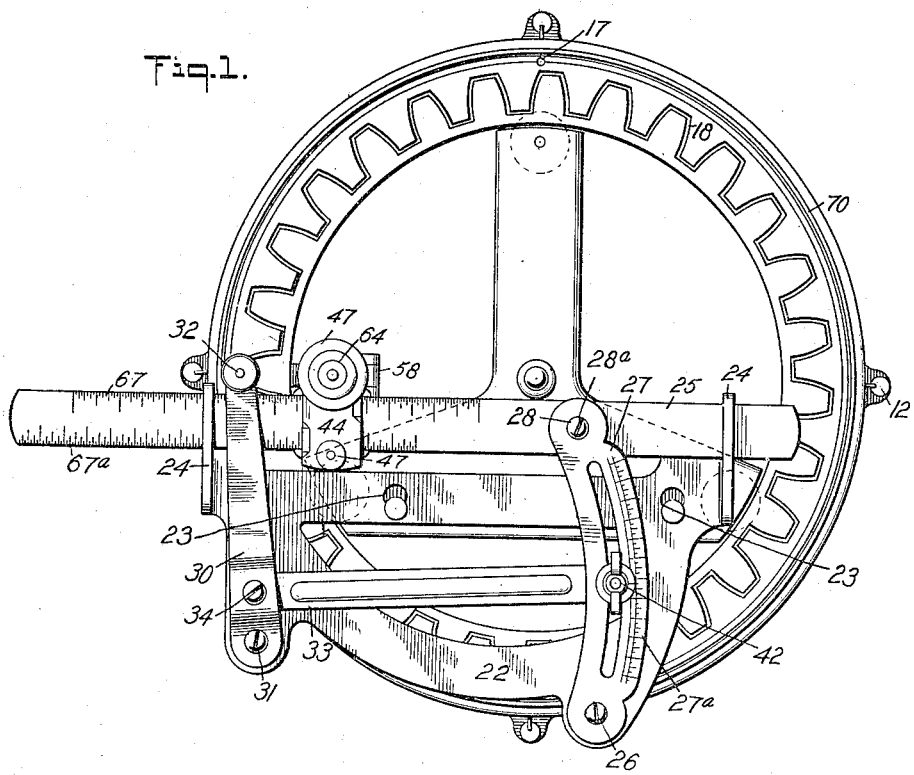
Figure 1 is a plan view of my invention.

By referring to the drawings, it will be seen that a base 10 is provided having vertical guideways 11 in which thumb tacks 12 are disposed, it being possible to press these thumb tacks 12 down into a drawing board to hold the base 10 relatively thereto. The base 10 has inner threads 13 with which mesh threads on a supporting ring 14 having an annular recess 15 in which a master guide member 16 is detachably disposed, this master guide member 16 being held in position relatively to the supporting ring 14 by a pin 17, and being provided with guide means 18 which may be in the form of gear teeth, as shown in Fig. 1 of the drawings. The master guide member 16 may be removed from the supporting ring 14, so that another master guide member may be substituted therefor.

The supporting ring 14 has an inner circular groove 19 in which travel rollers 20 which are rotatably mounted on a supporting frame 21, it being possible for the supporting frame 21 to rotate relatively to the supporting ring 14 and the master guide member 16. On the supporting frame 21 there is disposed a frame 22, this frame 22 being held in position on the supporting frame 21 by screws 23, in a manner readily understood. Secured to the frame 22 and extending therefrom, there are guides 24 in which is disposed a beam 25, it being possible for this beam 25, which extends across the instrument, to move longitudinally. Fulcrumed to the frame 22 at 26 there is a slotted lever 27, the lever 27 being articulated to the beam 25 at 28. This slotted lever 27 is provided for moving the beam longitudinally, and, in order to permit of the free movement of the beam, the slotted lever 27 where it is articulated at 28 to the beam, has a slot 29 in which a pin 28ª is disposed. Another lever 30 is fulcrumed to the frame 22 at 31, and to this lever 30 there is secured a tracer 32 which is adapted to travel in the guide means 18, which may be made to represent teeth of a spur, worm or other gear. A link 33 is articulated to the lever 30 at 34, the terminal 35 of the link 33 being disposed under the slotted lever 27 and being preferably separated therefrom by a washer 36. A screw 37 is disposed upwardly through an orifice 38 in the end 35 of the link 33, the head 39 of the screw 37 abutting against the end 35 of the link 33, around the orifice 38. This screw 37 also extends up through the washer, through the slot in the lever 27 and through an orifice 40 in a slot-engaging member 41, a wing nut 42 meshing with the thread on the screw 37 and pressing against the slot-engaging member 41 for holding a fin 43 on the slot-engaging member 41 down in the slot in the lever 27.

It will be understood that by turning the nut 42 the end 35 of the link 33 may be moved to or from the beam 25 as desired, the fin 43 on the slot-engaging member 41 sliding in the slot in the lever 27 until the end 35 of the link 33 has reached the position desired with reference to the slotted lever 27, when the wing nut 42 may be turned home to press the slot-engaging member 41 against the lever 27 and the head 39 of the screw 37 against the under side of the end 35 of the link 33. Further movement of the end 35 of the link 33 longitudinally of the slotted lever 27 is prevented, while the construction permits of a rocking movement of the end 35 of the link 33 relatively to the said slotted lever.

It will be seen that with the movement of the tracer 32 in the guide means 18, the beam 25 will be operated by means of the lever 30, the link 33 and the slotted lever 27. The marking means is mounted on the beam 25, and is adapted to move longitudinally of the beam 25 and be held in adjusted position. The marking means has a pen-carrier 44 with a recess 45 in which the beam 25 is disposed, the pen-carrier being provided with a wedge member 46 for holding the pen-carrier 44 in adjusted position relatively to the beam, this wedge 46 being secured in position by means of a screw 47 which is disposed in an orifice 48 in the pen-carrier 44 and which meshes in a threaded orifice 49 in the wedge member 46. The pen-carrier 44 has a circular opening 50 in which a tube 51 is disposed, this tube 51 having a shoulder 52 which engages the under side of the pen carrier 44, the tube 51 being held upwardly with its shoulder 52 against the under side of the pen-carrier by means of a nut 53 which meshes with a thread 54 on the tube 51. A spring 55 serves to hold the nut 53 yieldingly upwardly with the tube 51 at its shoulder 52 engaging the under side of the pen-carrier. Extending from the pen-carrier 44 there are locking means 56 which engage locking means 57 on the tube 51 when the tube 51 is pressed upwardly by means of the nut 53 and a spring 55; but when the nut 53 is screwed upwardly relatively to the tube 51, it is possible to free the locking means 56, and the locking means 57, so that the tube 51 may be rotated relatively to the pen-carrier 44, it being possible to lock the tube 51 relatively to the pen-carrier 44 in its new position by the means which have been described. Hinged to the bottom of the tube 51 at 58 there is a pen arm 59, which carries a pen 60, the pen arm 59 having an opening 61 in which the lower end of a rod 62 is disposed, this rod 62 being connected with the pen arm 59 by means of a pin and slot 63. The upper end of this rod 62 is threaded, and a nut 64 meshes with the thread on the rod 62, by means of which and a spring 65 which engages a washer 66 at the top of the tube 51, the rod 62 is held yieldingly upward, it being possible however, by turning the nut 64, to permit the rod 62 and the pen arm 59 to descend until the pen 60 rests on the paper over which the base 10 is disposed. But when the instrument is to be adjusted, the nut 64 may be turned, thereby raising the rod 62 until the pen 60 is raised from the paper.

There is a scale 67 on the beam 25, and by referring to this scale, it is possible to adjust the pen-carrier 44 relatively thereto, to draw gears of any desired size, the depth of the teeth of the gears being regulated by means of the adjustment of the end 35 of the link 33 relatively to the slotted lever 27, there being a scale 27ª on this slotted lever 27, so that the desired position of the end 35 of the link 33 may be readily determined.

A master guide member 16 having any desired number of teeth, may be mounted on the supporting ring 14, and may be held in position relatively thereto by the pin 17, and with this master guide member gears may be drawn having the same number of teeth, and of any desired pitch diameter by the adjustment of the pen-carrier 44 relatively to the beam 25, it being possible to regulate the depth of the teeth which are to be drawn, by the means which have been described.

In Fig. 10 of the drawings, there is illustrated a tooth of a gear which is drawn by the instrument which is the subject matter of this application, the tooth being of less diameter than the master guide member from which it is drawn.

Figure 2:
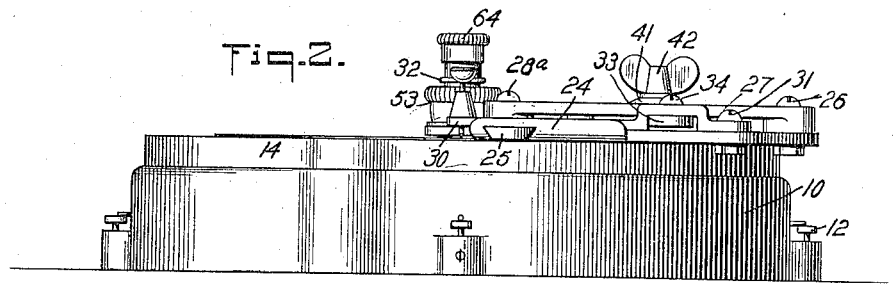
Fig. 2 is a side elevation of Fig. 1.
Figure 3:
Fig. 3 is a transverse sectional elevation of Fig. 1.

The base 10 which is shown in Figs. 2 and 3 of the drawings may be used to draw gears which are of the same or of less diameter than the master guide member, but when it is desired to draw gears having a greater diameter than the master guide member, I prefer to make use of a base 10ª, in lieu of the base 10. This base 10ª has an outer thread which meshes with the inner thread 68 on the supporting ring 14. This base 10ª is illustrated in Fig. 4 of the drawings, and when it is used, the pen-carrier 44 is disposed on the beam 25 beyond the supporting ring 14.

The instrument has a centering pen 69 which may be raised, as illustrated in Fig. 3 of the drawings, when a very small gear is to be drawn. The beam 25 is provided not only with the scale 67, but also with a second scale 67ª one of these scales being made use of when the pen arm 59 extends outwardly, as illustrated in Fig. 3 of the drawings, and the other scale being used when the pen arm 59 extends inwardly as illustrated in Fig. 4. When a bevel or miter gear is to be drawn, a gear may be laid out on a separate piece of paper having the proper number of teeth and the two face circles. This piece of paper may then be located under the tracing, and the radial teeth lines drawn from face circle to face circle, the draftsman being guided as to spacings by the layout upon the paper which has been drawn with the instrument. When a circle is to be drawn, this may be done by disposing the tracer 32 in an annular groove 70.

When the gear is to be dotted, the pen arm 59 is held in raised position by the means which have been described, and as the tracer 32 travels in the guide means, the nut 64 is tapped so as to press the rod 62 down periodically, which permits the pen arm 59 and the pen 60 to fall to paper making dotted lines.

Having thus described my invention, what I claim as new and desire to secure by Letters Patent, is:

1. In a gear drawing instrument, a master member having guide means, a beam disposed across the master member, a marking member carried by the beam, a tracer for moving in the guide means of the master member, and means operable by the tracer for actuating the beam.

2. In a gear drawing instrument, a master member having guide means, a beam, a marking member adjustably mounted on the beam, means to secure the marking member in adjusted position on the beam, a tracer for moving in the guide means of the master member, and means operable by the tracer for actuating the beam.

3. In a gear drawing instrument, a master member having guide means, a beam, a marking member carried by the beam, a tracer for moving in the guide means of the master member, a lever for operating the beam, and means adjustable relatively to the lever and normally secured thereto for actuating the lever, the said means being operable by the tracer.

4. In a gear drawing instrument, a master member having guide means, a beam, a marking member carried by the beam, a tracer for moving in the guide means of the master member, a lever for operating the beam, and means adjustable relatively to the lever and normally secured thereto for actuating the lever, the said means being operable by the tracer.

5. In a gear drawing instrument, a master member having guide means, a frame for moving relatively thereto, a beam, a marker carried by the beam, a tracer for traveling in the guide means, a lever pivoted to the frame for operating the beam, a lever pivoted to the frame and to which the tracer is secured, and a link connecting the two levers.

6. In a gear drawing instrument, a master member having guide means, a frame for moving relatively thereto, a beam, a marker carried by the beam, a tracer for traveling in the guide means, a lever pivoted to the frame for operating the beam, a second lever pivoted to the frame and to which the tracer is secured, and a link secured to one of the levers and adjustably secured to the other lever.

7. In a gear drawing instrument, a circular master member having guide means, a frame for rotating relatively thereto and provided with guides, a tracer for traveling in the guide means in the master member, a beam disposed for moving in the guides, and means for operating the beam and adapted to be actuated by the tracer.

8. In a gear drawing instrument, a master member having guide means, a frame for rotating relatively thereto and provided with guides, a tracer for traveling in the guide means in the master member, a beam disposed for moving in the guides, a lever fulcrumed to the frame and articulated to the beam for operating the latter, a lever secured to the frame to which the tracer is secured, and a link connecting the two levers.

9. In a gear drawing instrument, a support, a master ring having guide means, detachably secured to the support, a frame movable relatively to the support and provided with guides, a beam disposed in the guides for moving relatively thereto, marking means mounted on the beam, a lever fulcrumed to the frame and articulated to the beam for moving the latter, a tracer for traveling in the guide means of the master ring, and means connecting the tracer with the lever for operating the latter.

10. In a gear drawing instrument, a support, a master ring having guide means, detachably secured to the support, a frame movable relatively to the support and provided with guides, a beam disposed in the guides for moving relatively thereto, marking means mounted on the beam, a lever fulcrumed to the frame and articulated to the beam for moving the latter, a tracer for traveling in the guide means of the master ring, a second lever fulcrumed to the lever on which the tracer is mounted, and a link connecting the two levers.

11. In a gear drawing instrument, a support, a master ring having guide means detachably secured to the support, a tracer for traveling in the guide means in the master ring, a frame disposed over the master ring and rotatable relatively to the support, a beam disposed transversely of the master ring, guides on the frame in which the beam is adapted to move, and adjustable means mounted on the frame and operable by the tracer for actuating the beam.

12. In a gear drawing instrument, a support, a master ring having guide means detachably secured to the support, a tracer adapted to travel in the guide means, a frame disposed over the master ring and rotatable relatively to the support, a beam disposed transversely of the master ring, guides on the frame in which the beam is adapted to move, a slotted lever fulcrumed to the frame and articulated to the beam, a second lever fulcrumed to the frame, to which the tracer is articulated, a link articulated to the second lever, and means adjustably secured to the first lever at its slot to which the link is articulated.

13. In a gear drawing instrument, an operating beam, a pen-carrier mounted on the beam and provided with a tube, a pen arm hinged to the tube, a rod secured to the pen and having a threaded portion, and a nut meshing with the thread and abutting against the tube for moving the pen arm relatively to the tube.

14. In a gear drawing instrument, an operating beam, a pen-carrier mounted on the beam and provided with a tube, a pen arm hinged to the tube, a rod secured to the pen and having a threaded portion, a nut meshing with the thread and abutting against the tube for moving the pen arm relatively to the tube, and resilient means for holding the nut yieldingly relatively to the tube.

15. In a gear drawing instrument, a pen-carrier having an opening and locking means, a tube disposed in the opening and having a thread and a shoulder against which the pen-carrier normally rests, companion locking means on the tube which engage the locking means on the pen-carrier when the pen-carrier is pressed against the shoulder, and a nut meshing with the thread on the tube for pressing the pen-carrier against the shoulder.

16. In a gear drawing instrument, a pen-carrier having an opening and locking means, a tube disposed in the opening and having a thread and a shoulder against which the pen-carrier normally rests, companion locking means on the tube which engage the locking means on the pen-carrier when the pen-carrier is pressed against the shoulder, a nut meshing with the thread on the tube for pressing the pen-carrier against the shoulder, a pen arm hinged to the tube, a threaded rod secured to the pen arm and disposed in the tube, and a nut meshing with the thread on the rod for holding the pen arm relatively to the tube.

17. In a gear drawing instrument, a supporting ring having a thread, a detachable base having a thread meshing with the thread on the supporting ring, a master ring having guide means mounted on the support, a frame rotatable relatively to the support and provided with guides, a beam disposed in the guides for moving relatively thereto, marking means mounted on the beam, a lever fulcrumed to the frame and articulated to the beam for moving the latter, a tracer for traveling in the guide means in the master ring, and means connecting the tracer with the lever for operating the latter.

18. In a gear drawing instrument, a master member having guide means, a marking member, a tracer for moving in the guide means on the master member, and means rotatably mounted relatively to the master member and operable by the tracer for actuating the marking member.

19. In a gear drawing instrument, a support having a circular groove, a master ring having guide means and mounted on the support, a frame rotatable relatively to the support, rollers mounted on the frame for traveling in the circular groove, guides on the frame, a beam disposed in the guides for moving relatively thereto, marking means mounted on the beam, a lever fulcrumed to the frame and articulated to the beam for moving the latter, a tracer for traveling in the guide means in the master ring, and means connecting the tracer with the lever for operating the latter.

20. In a gear drawing device, a master member having guide means, a frame, means for directing the movement of the frame relatively to the master member, a marker, a tracer for traveling in the guide means, and means mounted on the frame and movable relatively thereto by which the tracer is adapted to operate the marker.

21. In a gear drawing instrument, a master member having guide means, a rotatably mounted frame movable relatively to the master member, a tracer for traveling in the guide means, and means mounted on the frame and movable relatively thereto by which the tracer is adapted to operate the marker.

In testimony whereof I have signed my name to this specification in the presence of two subscribing witnesses.

CHARLES H. SAPPER.

Witnesses:
W. E. KIRKWOOD,
D. E. KEISTER.